United States Patent [19]

Henkelmann et al.

[11] Patent Number: 5,200,163

[45] Date of Patent: Apr. 6, 1993

[54] REMOVAL OF PHOSGENE FROM OFF-GASES

[75] Inventors: Jochem Henkelmann, Ludwigshafen; Thomas M. Kahl, Roemerberg; Irene Troetsch-Schaller, Frankenthal; Leopold Hupfer, Friedelsheim; Wolfgang Franzischka, Frankenthal; Wolfgang Schwarz, Otterstadt, all of Fed. Rep. of Germany

[73] Assignee: BASF Aktiengesellschaft, Ludwigshafen, Fed. Rep. of Germany

[21] Appl. No.: 785,288

[22] Filed: Oct. 30, 1991

[30] Foreign Application Priority Data

Dec. 13, 1990 [DE] Fed. Rep. of Germany ....... 4039750

[51] Int. Cl.$^5$ .............. C01B 7/07; B01D 47/00
[52] U.S. Cl. .................... 423/240 R; 55/71; 423/481; 423/488
[58] Field of Search ............. 423/240 R, 481, 488; 55/71

[56] References Cited

U.S. PATENT DOCUMENTS

| | | | |
|---|---|---|---|
| 3,789,580 | 2/1974 | Allemang et al. | 55/71 |
| 4,064,218 | 12/1977 | Scholz et al. | 423/240 R |
| 4,157,333 | 6/1979 | Nakatani et al. | 549/436 |
| 4,301,126 | 11/1981 | Duembgen et al. | 423/240 R |
| 4,493,818 | 1/1985 | Gross | 423/499 |
| 4,568,741 | 2/1986 | Livingston | 536/16.2 |
| 4,595,575 | 6/1986 | Oeste et al. | 423/240 R |
| 4,900,523 | 2/1990 | Bicker et al. | 423/236 |

FOREIGN PATENT DOCUMENTS

| | | |
|---|---|---|
| 2000442 | 4/1990 | Canada . |
| 367050 | 5/1990 | European Pat. Off. . |
| 452806 | 10/1991 | European Pat. Off. . |
| 2131403 | 12/1972 | Fed. Rep. of Germany . |
| 2344217 | 3/1975 | Fed. Rep. of Germany . |
| 2531545 | 2/1977 | Fed. Rep. of Germany . |
| 2919661 | 11/1980 | Fed. Rep. of Germany . |
| 3346176 | 7/1985 | Fed. Rep. of Germany . |
| 3625378 | 2/1988 | Fed. Rep. of Germany . |

Primary Examiner—Gary P. Straub
Assistant Examiner—Valerie Lund
Attorney, Agent, or Firm—John H. Shurtleff

[57] ABSTRACT

To remove phosgene from off-gases, the former is reacted in a washing zone with a liquid which contains or is composed of compounds of the formula

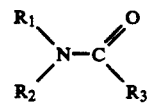

where $R_1$ and $R_2$ are identical or different and are each aliphatic or cycloaliphatic alkyl of 1 to 8 carbons, or $R_1$ and $R_2$ are $-(CH_2)_n-$ where n is 4 or 5, $R_3$ is hydrogen or aliphatic or cycloaliphatic alkyl of 1 to 6 carbon atoms, or $R_1$ or $R_2$ and $R_3$ are $-(CH_2)_m-$ where m is 3, 4 or 5.

The liquid can be regenerated by the addition of water, and the regenerated liquid can be returned to the washing zone.

7 Claims, 1 Drawing Sheet

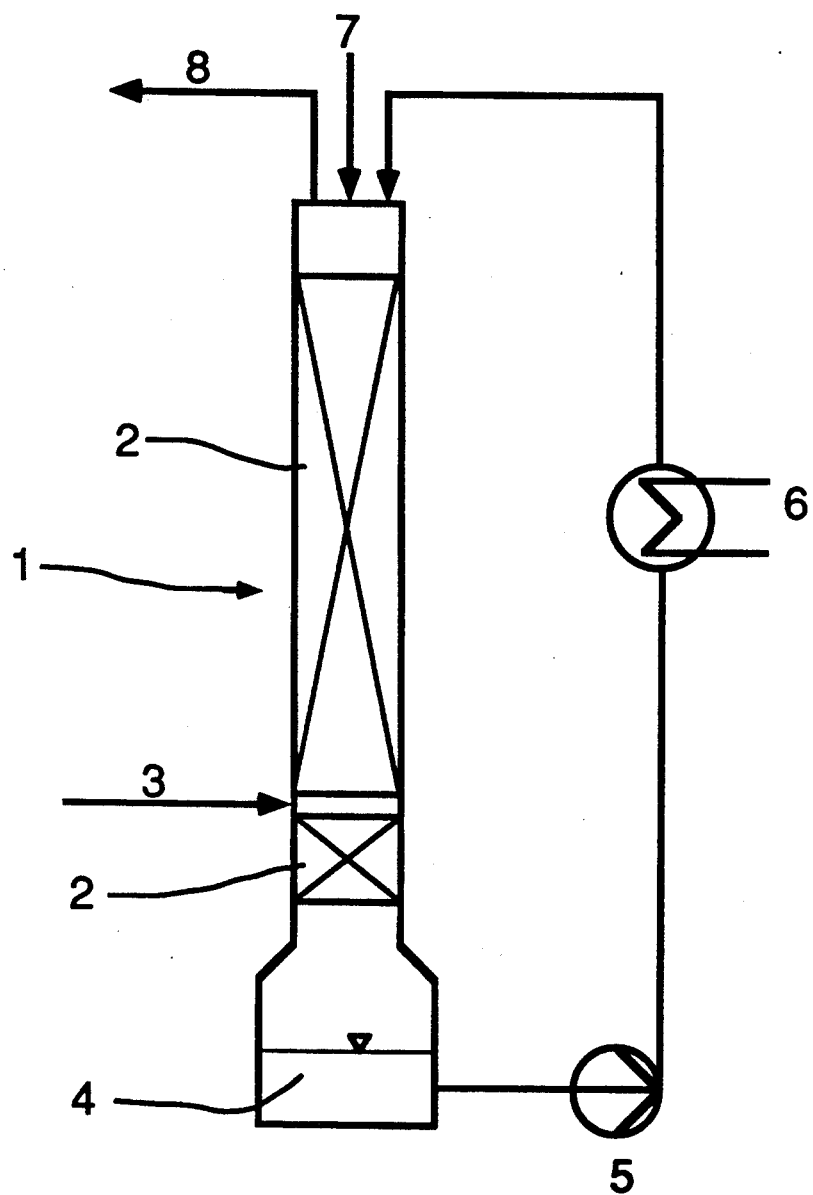

REMOVAL OF PHOSGENE FROM OFF-GASES

Phosgene is, because of its high chemical reactivity, often employed for synthesizing intermediates such as carbonyl chlorides, chloroformates, carbamoyl chlorides and isocyanates. These valuable intermediates are in turn used to prepare polyurethane plastics, drugs, crop protection agents, dyes, paints and adhesives.

Because of their toxicity, phosgene-containing off-gases must be carefully purified Several methods have been disclosed for this. The commonest method is chemical washing of phosgene-containing off-gases with sodium hydroxide solution. In order to increase the rate of phosgene decomposition it is common to add tertiary amines (U.S. Pat. No. 4 493 818, DE-A 36 25 378) or ammonia itself (DE-B 25 31 545). However, this off-gas treatment results in large amounts of waste water which need additional treatment where appropriate (removal of amines, for example).

The hydrolysis can also be carried out on solid catalysts such as active carbon (DE-A 21 31 403, DE-B 29 19 661) or on ion exchangers (Wolf and Renger, Z. Chem. 15 (1975) 284 et seq.).

Other methods are adsorption onto anhydrous alumina (U.S. Pat. No. 3 789 580) and onto active carbon (DE-A 33 46 176). The phosgene which is liberated again on the subsequent desorption must additionally be decomposed, for example by hydrolysis with sodium hydroxide solution.

Phosgene can also be destroyed by reaction with steam at above 900° C. (DE-A 23 44 217). This results in flue gases containing chlorine and hydrogen chloride which must subsequently be treated in a scrubber. The disadvantages of this process are the high temperatures and the corrosion of metallic materials caused by the hydrogen chloride at these high temperatures.

It is an object of the present invention to provide a method which is as straightforward and reliable as possible for eliminating phosgene from phosgene-containing off-gases without also resulting in large amounts of waste water.

We have found that this object is achieved by treating the off-gas in a washing zone with a liquid which contains or is composed of compounds of the formula

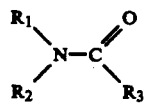

where $R_1$ and $R_2$ are identical or different and are each aliphatic or cycloaliphatic alkyl of 1 to 8 carbons, or $R_1$ and $R_2$ are —$(CH_2)_n$— where n is 4 or 5, $R_3$ is hydrogen or aliphatic or cycloaliphatic alkyl of 1 to 6 carbon atoms, or $R_1$ or $R_2$ and $R_3$ are —$(CH_2)_m$— where m is 3 or 4.

The process according to the invention is based on that fact that the phosgene present in the off-gases reacts quantitatively with the washing liquid, e.g. with dialkylformamides 1, to give the Vilsmeier salt 2 and carbon dioxide as shown by equation 1:

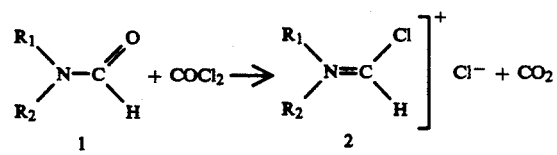

On the other hand, this Vilsmeier salt reacts with water to form the dialkylformamide again:

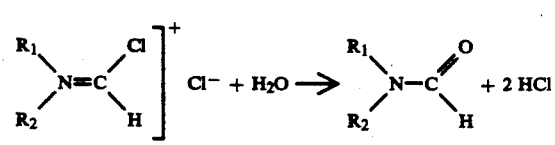

with 2 mol of hydrogen chloride being produced per mol of reacted phosgene. This makes it possible to combine the washing and regeneration in a cyclic process in which the washing liquid charged with phosgene is extracted from the washing zone and recovered by reaction with water in a regeneration zone and returned to the washing zone. This cyclic process can be represented by the following equation:

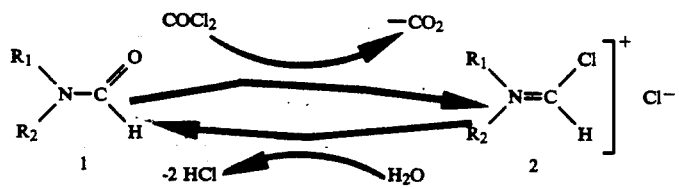

so that the overall reaction is decomposition of phosgene with water to carbon dioxide and hydrogen chloride:

The dialkylformamide 1 is continuously regenerated and returned to the cyclic process.

If the amount of water used to hydrolyze the Vilsmeier salt does not exceed the stoichiometric amount, no waste water is produced. The anhydrous hydrogen chloride formed in the hydrolysis can, moreover, be isolated as valuable product.

If hydrogen chloride forms a stable HCl adduct with the liquid employed, the stoichiometric amount of HCl is bound before HCl is evolved. This is the case when dialkylformamides are used, for example.

It is possible to employ for the process according to the invention alkyl-substituted formamides of the formula

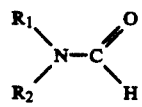

where $R_1$ and $R_2$ are identical or different and are each aliphatic and cycloaliphatic radicals of 1 to 8 carbons, which can also be branched, such as methyl, ethyl, isopropyl, isobutyl, 2-ethylhexyl, cyclopentyl or cyclohexyl. $R_1$ and $R_2$ can also be —$(CH_2)_n$— with n=4 or 5.

It is, of course, also possible to use the corresponding compounds of other carboxylic acids, corresponding to the formula

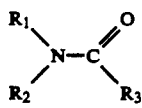

where $R_1$ and $R_2$ have the above meanings. $R_3$ can be hydrogen or aliphatic or cycloaliphatic alkyl of 1 to 6 carbon atoms. $R_1$ or $R_2$ and $R_3$ can also be —$(CH_2)_m$— where m is 3, 4 or 5.

It is, of course, also possible to use mixtures of said compounds in the process according to the invention.

It is possible in the process according to the invention to carry out the two reaction steps batchwise successively or expediently continuously, for example in a washing column or in a jet scrubber. The regeneration of the washing medium with water can be carried out in a hydrolysis apparatus which is located in the circulation or, for simplicity, directly in the off-gas scrubber.

The process according to the invention can be carried out without solvent or with the addition of an inert aprotic solvent such as chlorobenzene, dichlorobenzene, dimethyl sulfoxide, dimethylsulfolane, tetramethylsulfamide and dichloroethane.

The process according to the invention is carried out at temperatures below the boiling point of the relevant compounds or of the solvent which is used. The treatment should expediently be carried out at least 20° C. below the relevant boiling point.

The process according to the invention can be carried out by various techniques. It is preferred to have countercurrents of gas and washing liquid. It is crucial that washing liquid and gas come into intimate contact, i.e. with a large surface area, so that there is satisfactory substance transfer between the two phases. Suitable embodiments are well known, such as columns packed with glass, ceramic or plastic items or plate columns with bubble or sieve plates.

BRIEF DESCRIPTION OF THE DRAWING

A system for carrying out the process according to the invention is illustrated by way of example in the FIGURE.

A washing column is identified by 1 and is packed with glass Raschig rings 2 (diameter 10 mm). Phosgene-containing off-gas is introduced into the column at 3. The washing liquid is located in the bottom 4 of the column and is pumped by a rotary pump 5 to the top of the column 1 after the required temperature has been set, if necessary, in the heat exchanger 6. At the same time, water passes through line 7 to the top of the column, which results in the Vilsmeier salt formed in the lower part of the column being decomposed to washing liquid and HCl. The phosgene-free off-gas is extracted from the column through line 8. The amount of water is such that 1 mol of water plus any stripping losses is introduced per mol of phosgene washed out. If less water is introduced, absorption stops owing to saturation of the washing liquid, while there is a danger with larger amounts of water that the washing liquid will undergo hydrolysis. The addition of water can be controlled by the chlorine content of the recycled washing liquid or by its density or its conductivity.

Since the hydrolysis of the Vilsmeier salt to form the washing liquid again, as well as the reaction of the washing liquid with the phosgene take place virtually instantaneously, it is possible with a suitable height of column to accommodate the washing and regeneration zones in a single washing column but spatially separate from one another.

It is, of course, also possible to carry out the process according to the invention in an apparatus in which the two steps take place in 2 spatially separated sections.

EXAMPLES 1a–c 1.5 l of dimethylformamide were circulated by pumping at 2 l/min through the described washing column (50×1,500 mm) which was packed to a height of 1,000 mm with 10 mm Raschig rings. The column loading was 100 l of gas per hour. The gas had the composition stated in Table 1. To hydrolyze the Vilsmeier salt, the stated amount of water required by the stoichiometry was introduced each hour so that the loading of the reaction carrier was kept essentially constant. The internal temperature of the column was kept constant by means of an external heat exchanger. The off-gas leaving the top of the column contained only hydrogen chloride, carbon dioxide and nitrogen.

TABLE 1

| | Composition (% by vol.) | | | | Amount of water | Internal temperature |
|---|---|---|---|---|---|---|
| | HCl | $CO_2$ | $COCl_2$ | $N_2$ | (g/h) | °C. |
| Example 1a | 47 | 19 | 7 | 27 | 5.4 | 60 |
| Example 1b | 60 | — | 20 | 20 | 16.2 | 60 |
| Example 1c | — | — | 40 | 60 | 32.0 | 80 |

EXAMPLES 2–7

The procedure of Example 1 was used but with the difference that other washing liquids were employed in place of dimethylformamide.

EXAMPLE 2

Diethylformamide was employed as washing liquid under the conditions of Example 1a.

EXAMPLE 3

Di-sec-butylformamide was employed as washing liquid under the conditions of Example 1c.

EXAMPLE 4

Isobutylisopentylformamide was employed as washing liquid with the addition of 50% by weight dichlorobenzene under the conditions of Example 1c.

EXAMPLE 5

Dicyclohexylformamide was employed as washing liquid with the addition of 50% by weight dichlorobenzene under the conditions of Example 1a.

EXAMPLE 6

Diisopropylformamide was employed as washing liquid with the addition of 50% by weight dichloroethane under the conditions of Example 1b.

EXAMPLE 7

N-Methylpyrrolidone was employed as washing liquid with the addition of 50% by weight dichloroethane under the conditions of Example 1a.

A phosgene-free off-gas was obtained in each of Examples 2-7 too.

We claim:

1. In a process for removing phosgene from off-gases by washing with a liquid, the improvement which comprises:

reacting the phosgene contained by the off-gas in a washing zone with a wash liquid which consists essentially of at least one compound of the formula

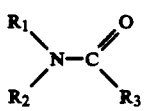

where $R_1$ and $R_2$ are identical or different and are selected from the group consisting of alkyl of 1 to 8 carbons and cycloalkyl of 5 to 8 carbon atoms, or $R_1$ and $R_2$ when taken together may also represent $-(CH_2)_n-$ where n is 4 or 5, and $R_3$ is selected from the group consisting of hydrogen, alkyl of 1 to 6 carbon atoms and cycloalkyl of 5 to 6 carbon atoms, or $R_1$ or $R_2$ when taken individually together with $R_3$ may also represent $-(CH_2)_m-$ where m is 3, 4 or 5, to form a Vilsmeier salt; and further reacting said salt with water to form an off gas containing HCl with the phosgene removed.

2. A process as claimed in claim 1, wherein the wash liquid is extracted from the washing zone, water is added to the wash liquid, and the extracted wash liquid is returned to the washing zone.

3. A process as claimed in claim 1, wherein said wash liquid contains an inert aprotic solvent.

4. A process as claimed in claim 1, wherein the washing treatment is carried out at a temperature of at least 20° C. below the boiling point of the wash liquid.

5. A process as claimed in claim 1, wherein said washing zone includes a column in which the off-gas containing phosgene is introduced near the bottom end and the wash liquid is introduced at the top end of said column such that a phosgene-free off-gas is removed at the top end of said column, and wash liquid collected at the bottom of the column is recycled to the top end of the column to maintain the absorption of phosgene while preventing hydrolysis of the wash liquid.

6. A process as claimed in claim 5, wherein the amount of water added to the wash liquid is about 1 mol, plus any loss of water stripped from the wash liquid by the off-gas, per mol of phosgene washed out.

7. A process as claimed in claim 5, wherein the washing treatment is carried out at a temperature of at least 20° C. below the boiling point of the wash liquid.

* * * * *